UNITED STATES PATENT OFFICE.

ALFRED W. PRATT, OF FLUSHING, NEW YORK, ASSIGNOR OF ONE-HALF HIS RIGHT TO HENRY S. LAMBERT, OF ORANGE, NEW JERSEY.

IMPROVEMENT IN LIQUID-DRIERS FOR OILS, PAINTS, &c.

Specification forming part of Letters Patent No. 211,782, dated January 28, 1879; application filed May 25, 1878.

*To all whom it may concern:*

Be it known that I, ALFRED W. PRATT, of Flushing, Long Island, in the State of New York, have invented a new and useful compound to be used as a Liquid-Drier for Oils, Paints, &c., which is fully set forth in the following specification.

To prepare forty-five gallons of the drier, take about ten pounds of caustic soda, seven and a half gallons of oil, (linseed preferred,) thirty-four pounds of rosin, and ten gallons of the aqueous solution of the chloride of manganese, such as is obtained as a residuum in the ordinary method of manufacturing chlorine gas from black oxide of manganese. Dissolve the soda in water, so as to produce a strong lye, which mix with the oil, and boil the mixture together in a kettle or other receptacle until the mass becomes plastic. Then put in as much of the aforesaid solution of chloride of manganese as the said mass will take up. After this cleanse the mixture with water. Then add the rosin and simmer the whole mass in a suitable receptacle over a fire until it becomes homogeneous. Then remove the mixture and add thereto about thirty-five gallons of linseed-oil.

Other oils may be used instead of linseed-oil, other resinous substances instead of rosin, and various other changes may be made without departing from the spirit of my invention. Turpentine and naphtha may be substituted for a part of the oil, to thin the mixture.

Having thus set forth my invention, what I claim as new, and desire to secure by Letters Patent, is—

A drying composition compounded of caustic soda, oil, rosin, and aqueous solution of chloride of manganese, substantially as set forth.

In testimony that I claim the foregoing I have hereunto subscribed my name in the presence of two subscribing witnesses on this the 21st day of May, A. D. 1878.

ALFRED W. PRATT.

Witnesses:
   H. S. LAMBERT,
   JOHN DEANE, Jr.